Sept. 20, 1971　　　J. J. CUNEO ET AL　　　3,605,425
SHIP SYSTEM FOR THE TRANSPORTATION OF HIGHLY
TOXIC CARGOES
Filed Feb. 7, 1969　　　　　　　　　　　3 Sheets-Sheet 1

JOSEPH J. CUNEO
NORMAN K. BASILE
GEORGE R. KNIGHT
PETER A. LALANGAS
　　　　　　　INVENTORS

BY *Stevens, Davis, Miller & Mosher*
　　　　　　　　　ATTORNEYS

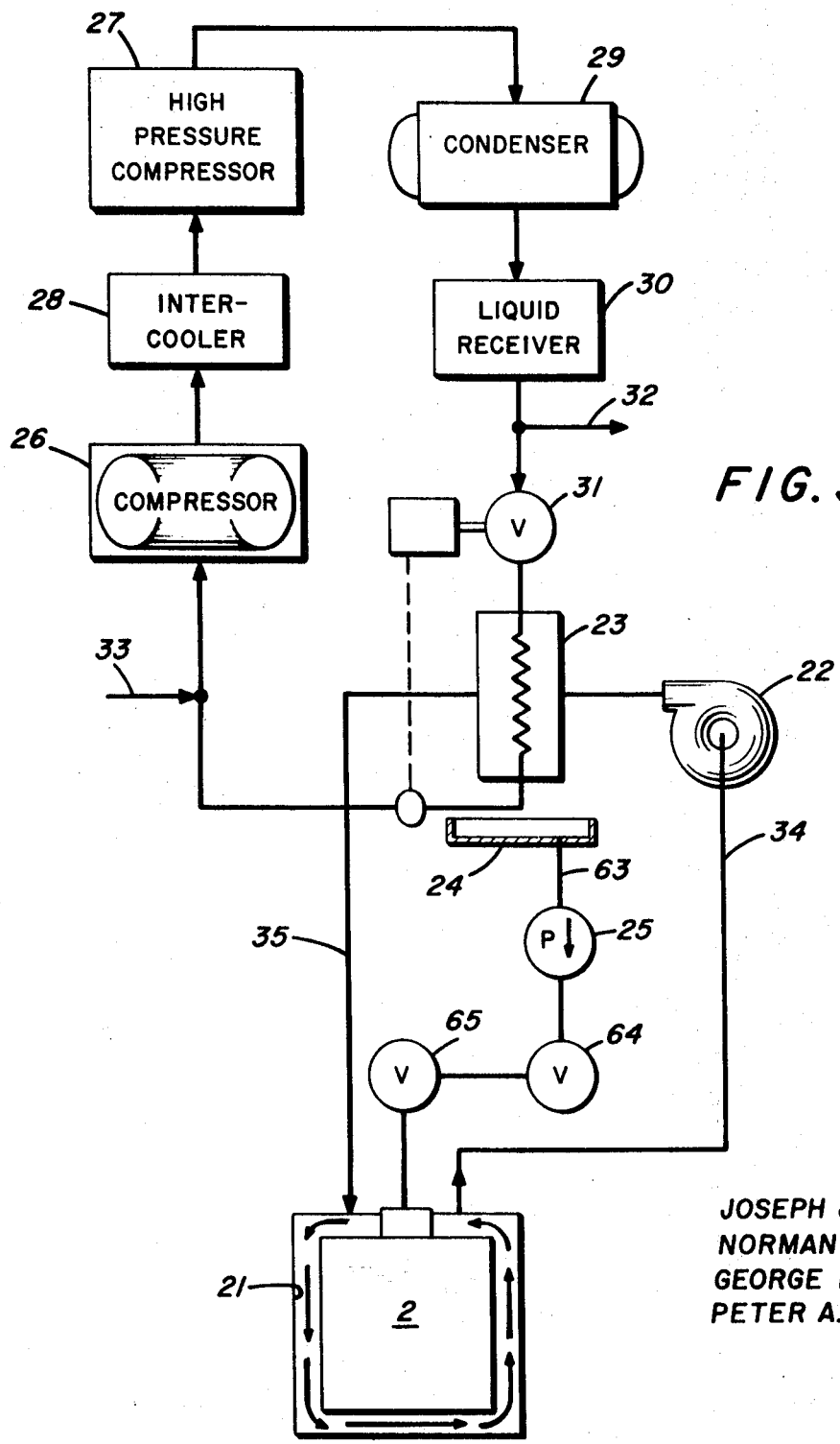

3,605,425
SHIP SYSTEM FOR THE TRANSPORTATION OF HIGHLY TOXIC CARGOES
Joseph J. Cuneo, Scarsdale, Norman K. Basile, Hauppauge, George R. Knight, Port Washington, and Peter A. Lalangas, Riverdale, N.Y., assignors to John J. McMullen Associates, Inc., New York, N.Y.
Filed Feb. 7, 1969, Ser. No. 806,335
Int. Cl. B63j 2/14; F17c 13/00
U.S. Cl. 62—54
19 Claims

ABSTRACT OF THE DISCLOSURE

A ship system for transportation of highly toxic cargoes having liquid densities greater than water and gas densities greater than air, such as chlorine. The ship system combines a series of unique features to maximize safety of both human and aquatic life. The ship system consists of a series of cargo tanks arranged longitudinally along the centerline of the ship, each cargo tank isolated from the remainder of the ship by means of a secondary barrier space formed by insulated longitudinal and transverse bulkheads, inner bottom and upper deck. The system provides extensive unique collision protection features to minimize the probability of cargo liquid and/or gas release to the atmosphere, which may be caused by grounding or collision with another ship. Further, the system eliminates the need for handling cargo gas during transit, which also adds to personnel safety.

BACKGROUND OF THE INVENTION

The present invention relates to a novel ship system for the transportation in bulk of highly toxic cargoes as, for example, chlorine, that are in the gas state at ambient temperature and pressure and that would be lethal or fatal to human, animal or aquatic life if contacted therewith. At present, toxic cargoes of this deadly nature, such as chlorine, are transported in pressurized containers at ambient temperature which means, of course, that the pressure is sufficient to maintain the chlorine in the liquid state. Due to the stringent safety requirements of regulatory bodies which are necessary for the protection of human, animal and aquatic life, the transportation of chlorine in large bulk quantities by present pressurized containment means is uneconomical.

Although abundant quantities of chlorine can be produced, a substantial imbalance exists between supply and demand as regards geographic locations. For this reason, the ship transportation of large quantities, such as 10,000 long tons, of chlorine would be of extreme economic benefit, provided such shipment could be made under such conditions of safety that human, animal and aquatic life would not be jeopardized. Although at the present time large-scale bulk ocean transportation of chlorine is feasible in terms of using present technology and pressurized containers, the economics of transporting approximately 10,000 long tons of chlorine in pressurized containers are sufficiently unfavorable from an expense and ship size standpoint to render a project with this end result unthinkable.

Whereas chlorine is a highly toxic cargo to which the present invention pertains, nevertheless, highly toxic cargoes of like nature are within the purview of the present invention.

BRIEF DESCRIPTION OF THE INVENTION

According to the present invention, the transportation of the highly toxic cargo is effected, in the case of chlorine, in a way that will maximize safety to nearby human and aquatic life and which takes into account and makes provision for the various contingencies likely to result in contact between the toxic cargo and nearby life. The point cannot be stressed or emphasized too strongly that all precautions must be undertaken to preclude contact between the toxic cargo and nearby life and if, due to unforeseen or uncontrollable events, such contact actually does occur, the danger to nearby life must be minimized to the greatest extent possible and terminated as quickly as possible.

The three basic contingencies that would result in chlorine gas entering the atmosphere and endangering nearby life are: (1) internal failure of the cargo container system; (2) failure resulting from handling the cargo during transit; and (3) failure due to external causes, such as collision.

By means of the present invention these three contingencies are fully taken into account and a novel ship system is disclosed having a variety of features to provide the maximum safety to nearby life. Also, though perhaps not on a value par with safety to nearby life, the novel ship system of the present invention further provides a simple and economic way of transporting large bulk quantities of such toxic cargoes.

The novel ship system of the invention includes a series of single wall cargo tanks serially spaced along the centerline of the ship, each tank being surrounded by a barrier space defined by an insulated gas and liquid tight secondary barrier structure located away from the tank walls, the secondary barrier structure itself is completely surrounded by void spaces except for the transverse portion of each secondary barrier structure, which lies intermediate an adjacent pair of cargo tanks. The cargo, such as chlorine, is carried as a liquid in a refrigerated equilibrium condition, so that its pressure is essentially equal to that of atmospheric pressure. The equilibrium conditions for chlorine which yield the foregoing are a temperature of minus 30° F. and atmospheric pressure. Chlorine liquid has a density greater than that of water, and the ship system of the present invention is intended for the handling of refrigerated liquid cargoes having densities of approximately 80 to 140 pounds per cubic foot and carrying these liquid cargoes at refrigerated temperatures ranging from 0° F. to minus 50° F., such cargoes normally being in the gas state at ambient temperature and pressure and have densities greater than air. The barrier space, in conjunction with a closed recirculation system, serves the functions of (a) maintaining the temperature of the cargo tanks to eliminate boil-off, (b) leak detection, (c) reliquifaction of any leakage of cargo that goes into the gaseous state, and (d) containment of any leakage that remains in the liquid state.

The outer structure of the novel ship system of the present invention includes location of the secondary barrier structure materially inboard from the shell of the ship, thus forming a deep outer space, which space is divided into void and ballast spaces by divisional bulkheads. The side portions of this outer space are fitted with deep transverse web frames and extra longitudinal decks which, in conjunction with the depth of the outer space, provides for maximum energy absorption before penetration of the secondary barrier structure in the event of side collision. Similarly, the bottom of the secondary barrier space is protected from grounding by its being located substantially above the bottom of the shell and energy absorption is provided by intermediate vertical floors and longitudinal structures which span the distance from the shell bottom to the barrier bottom. Additional collision and grounding protection is provided by locating the carbo tank walls further inboard and vertically above the secondary barrier. Protection against damage to the forward cargo tank from bow-on collisions is provided by arranging a deep bow section consisting of a forepeak tank forward of the collision bulhead and a deep tank aft of the collision bulkhead. Further, a cofferdam is located forward of the forwardmost cargo tank and aft of the aftmost cargo tank to segregate the cargo area from the bow and stern sections of the vessel. A passive tank roll stabilization system is installed aft of the aft cofferdam to minimize heat transfer which would cause boil-off and to reduce the cargo tank stress component effected by dynamic loads.

OBJECT OF THE INVENTION

Accordingly, the principal object of the present invention is to provide a ship system for the transportation of highly toxic cargoes, such as chlorine, having the fetaures as described which will effect a maximum degree of protection against the release of the toxic cargo for the reasons previously mentioned.

BRIEF DESCRIPTION OF THE DRAWING

Other and further objectives will become apparent from the following detailed description of a preferred embodiment of the present invention when taken in conjunction with the appended drawings in which:

FIG. 3 is a schematic showing of the refrigeration system for cooling the barrier space.

DETAILED DESCRIPTION OF THE PREFERRED EMBODIMENT

Figure 1:
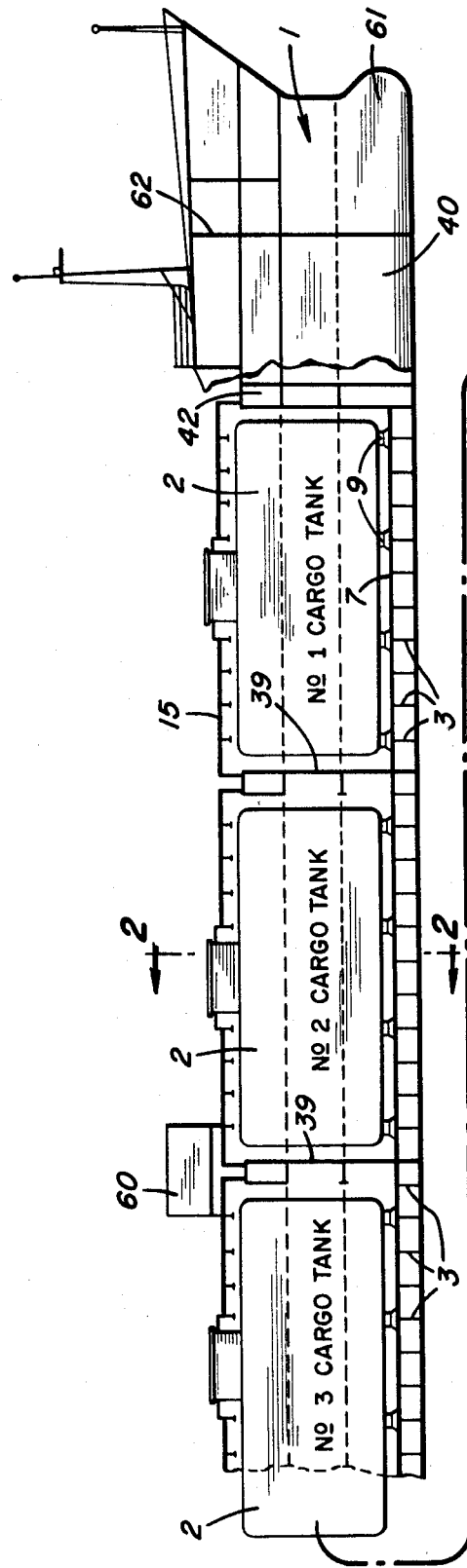
FIG. 1 is a view in elevation partly broken away showing the novel ship system of the invention.
Figure 1:
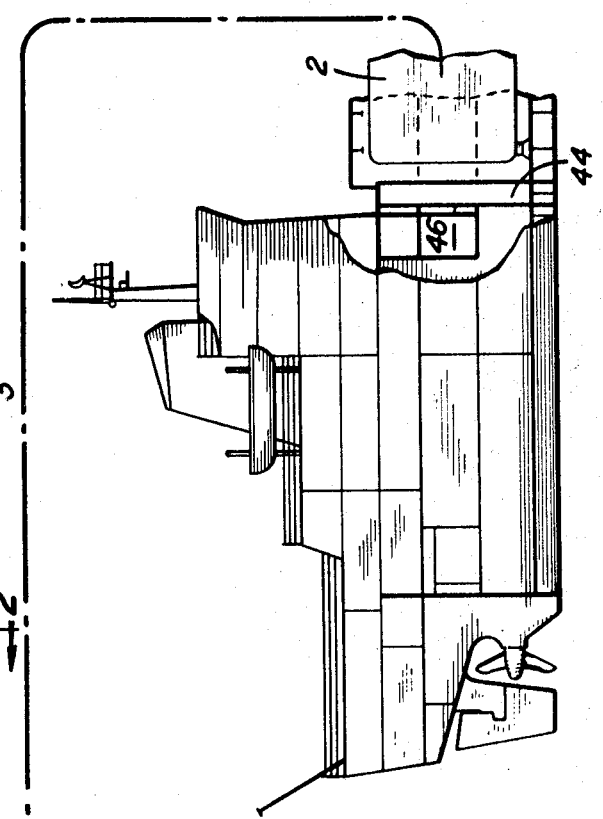
Figure 2:
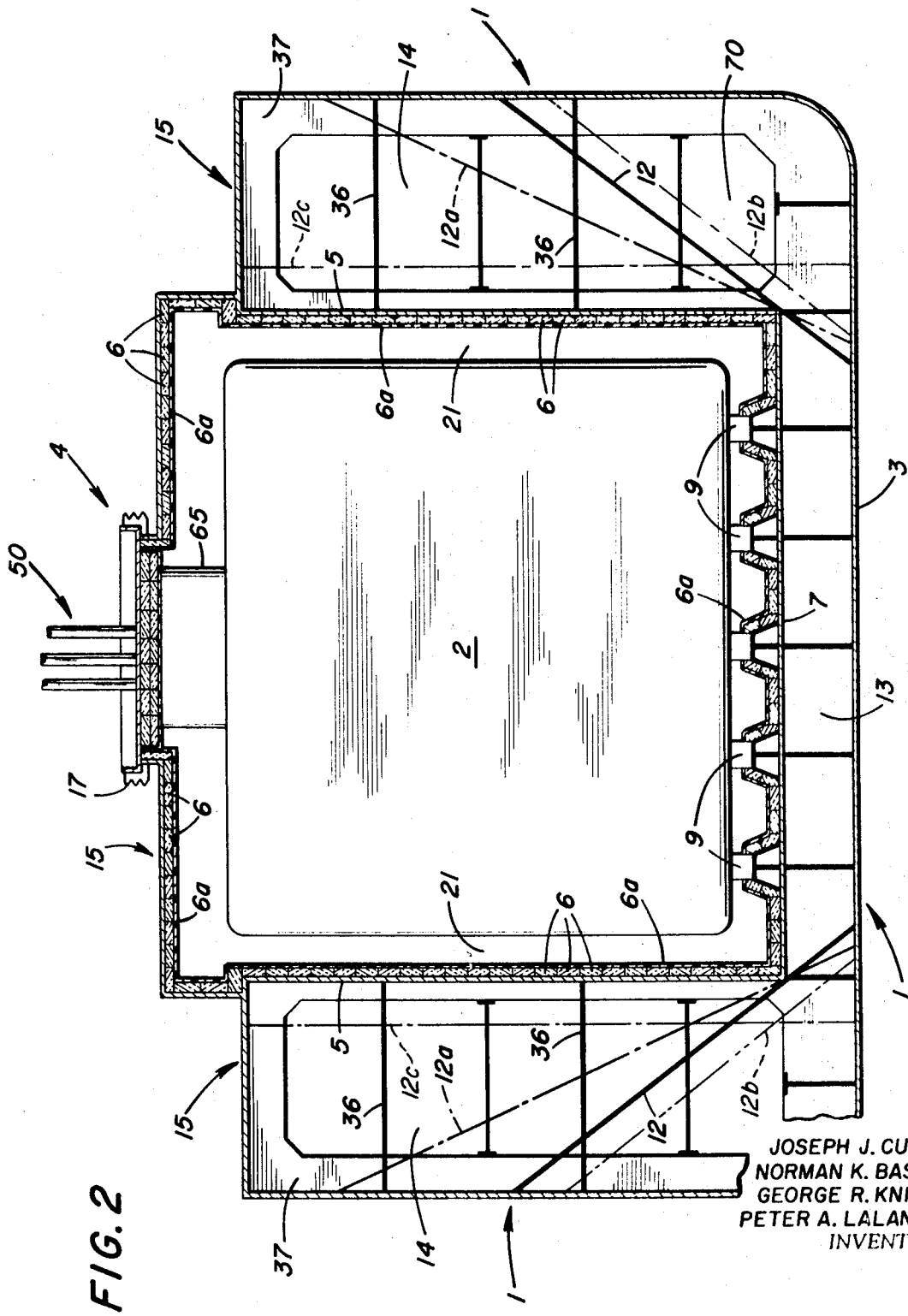
FIG. 2 is a view in vertical section taken along 2—2.

The present invention provides a safe and economical ship system for the large-scale bulk shipment of highly toxic cargoes. The following description will be made with reference to the transportation of chlorine, as this is the preferred example, but it will be appreciated that the ship system is suited for the transportation of like highly toxic cargoes.

The ship system is comprised of a series of independent structural low temperature steel, single wall cargo tanks 2 spaced longitudinally from each other within the ship's shell. The cargo tanks 2 constitute a primary barrier for containment of the toxic cargo. Surrounding the tanks 2 and spaced therefrom is a secondary barrier structure comprised of a pair of longitudinal bulkheads 5, an inner bottom 7, transverse bulkheads 39, and upper deck structure 15. The space between the primary and secondary barriers is designated by the reference numeral 21.

The inner surfaces of the secondary barrier are fitted consecutively with insulation blocks 6, such as polyurethane blocks, and are faced with a liquid- and gas-tight flexible impervious lining 6a, such as a plastic sheet or film made of polyvinyl chloride, Teflon, or other suitable material which is generally resistant or inert to chlorine. Also, the secondary barrier is fabricated of low carbon steel.

The cargo tanks 2 are supported above the inner bottom 7 by means of foundations 9, and the tanks are restrained within the ship and permitted to expand about a fixed point at their bottom by the use of conventional restraining keys and chocks (not shown). Emergency provision is made for preventing the tank from rising in the event barrier space 21 is flooded, and this is effected by means of conventional buoyancy chocks (not shown). Likewise, collision chocks (not shown) are fitted between the tank sides and the bulkheads 5 in a conventional manner to prevent the tank from shifting in the event of shock loading.

Space 21 is sufficiently wide to enable complete access for inspection of the primary barrier exterior, insulation, foundations, keys and chocks.

The tops of the tanks 2 are enclosed by superstructure 15, which is sealed to the tank hatch 4 by means of an expansion joint 17, which is both liquid- and gas-tight. Loading and discharge piping, generally designated as 50, passed through the hatch 4 in a usual sealed way.

The space 14 between the shell 1 and the longituidnal bulkhead 5 of the secondary barrier is made considerably wider than what is normally provided for liquefied gas ship construction and, in the specific embodiment shown, represents 20% of the beam established at the maximum ship's beam. Consequently; bulkheads 5 are inclined inboard in the forward and after sections of the ship to maintain a uniform width for space 14 throughout the cargo containment section of the ship. Thus, the forward and after cargo tanks are tapered on their forward and after ends, respectively. The space 14 is provided with a number of horizontally disposed, vertically spaced collision decks 36 and deep web frames 37 for the purpose of absorbing energy of collision. Besides the upper deck 15 and shell 1 at bottom, there are at least two collision decks 36. Additional protection against side collision damage is afforded by locating the side walls of tanks 2 materially inboard from bulkheads 5. In this embodiment, side walls of tanks 2 are located inboard of shell 1 at a distance equal to 24% of the ship's beam and this distance is maintained throughout the cargo area.

Space 13 defined between shell bottom 1 and inner bottom 7 is deeper than required by classification society regulations. Inner bottom 7 and shell bottom 1 are interconnected by longitudinal vertical structural members 8 and transverse floors 3. Certain of floors 3 and members 8 may have openings.

This deep double bottom structure complex affords a high degree of protection to the cargo tanks against damage due to grounding. Further grounding protection is provided by elevating bottom of tank 2 a substantial vertical distance from inner bottom 7.

Inclined bulkheads 12, shown contacting the lower corners of the secondary barrier, but otherwise spaced from the secondary barrier define the ballast tanks 70 outboard of bulkheads 12. Alternatively, the bulkheads 12 can be spaced from the secondary barrier and inclined to any angle, as for example, position 12a and position 12b, each shown in phantom, to obtain the necessary quantity of ballast and/or the required ballast center of gravity desired to effect proper stability. In the extreme vertical position of bulkheads 12, they would be spaced outboard from the longitudinal bulkheads 5 as shown in phantom at 12c. With any of these arrangements of bulkheads 12, a void space completely surrounds the secondary barrier. By providing a void space between bulkhead 12 and parts 5 and 7 of the secondary barrier, the possibility of ballast water affecting the insulation system through a rupture in part 5 or 7 is avoided, a would otherwise occur if bulkhead 12 were common to the secondary barrier. In the inclined position bulkhead 12 also affords a degree of collision protection.

Resistance against bow collision is provided by an exceptionally deep forepeak tank 61 and deep tank 40 arranged forward of the No. 1 cargo tank. The forepeak bulkhead 62 is located spaced from the bow more than the required 5% of the length of the ship, and intervening between the No. 1 cargo tank and the forepeak bulkhead 62 is a deep tank 40 and a cofferdam 42. Behind the last cargo tank, shown as cargo tank No. 3, a cofferdam 44 is located to isolate the stern portion of the ship from the cargo area. Passive tank stabilization system 46 provides aft of cofferdam 44 minimizes the ship's rolling motions and reduces cargo tank stresses and retards heat transfer. The depth of the bow section (parts 61, 40 and 42) should be such to prevent damage to the forward cargo tank for any bow-on collisions occurring at speeds of less than 12 knots.

One of the princpal objectives of the invention is to avoid the need for handling boil-off vapors from the cargo tank 2, which could result in an atmospheric release due to a failure in the handling system. The system of the present invention is designed to contain the cargo within the cargo tanks 2 at all times during normal transit without having to extract boil-off to maintain cargo tank design pressure. To this end, the cargo tanks 2 are completely sealed off, and the barrier space 21 surrounding the cargo tanks 2 is made part of a closed refrigeration system which functions to maintain this barrier space 21 at a temperature equal to or slightly lower than the cargo saturation temperature. Filtered and dehumidified air cooled to approximately minus 40° F. is circulated through the barrier space 21 and through the system as depicted in FIG. 3. The air circulation and cooling system is comprised of a draw-off line 34 leading to a circulating fan 22 which blows the air over a cooling coil 23 and back via a return line 35 to barrier space 21. Within the barrier space 21 are contained conventional supply, distribution and gathering systems to insure uniform circulation of air. The air, although it enters the barrier space 21 at approximately 10° F. below the saturation temperature of the cargo in cargo tank 2, will be withdrawn via line 34 at approximately the saturation temperature of the cargo. The air circulation and low side equipment must be insured of gas tightness.

The refrigeration system may be of any suitable type and in this embodiment consists of a rotary booster compressor 26, intercooler 28, high pressure compressor 27, condenser 29, liquid receiver 30, expansion valve 31, and cooling coil 23. The refrigerant employed can be selected from known refrigerants which are suitable for this purpose.

In addition to the foregoing, point probes and level gauges are fitted in the barrier space 21 to indicate the presence of any chlorine which will, in turn, be an indication of a leakage from tank 2. Liquid leakage will accumulate on the bottom of barrier space 21, energizing the point probe alarm nidicating a liquid leak. Chlorine gas in barrier space 21 will be picked up by the air circulation system and condensed on coil 23 and collected by drip tray 24. The liquid chlorine will be returned directly to the cargo tank 2 via line 23, pump 25 and double valve system 64 and 65, each valve being automatically actuated by chlorine gas sensors located in line 34. Sensors will simultaneously sound an alarm. Valves 64 and 65 are provided with remote locked manual override capability. A gas sensor is located between valves 64 and 65 to detect any leakage of chlorine gas past valve 65 in a closed position.

The conventional high side refrigeration system is provided in duplicate and connected in parallel to obtain 100% standby capability. Refrigerant supply to and return from the cooling coils of other cargo tanks is provided for by lines 32 and 33, respectively.

A refrigeration machinery room is fitted as a separate superstructure enclosure 60 between the hatches of cargo tanks Nos. 2 and 3. In addition to a refrigeration machinery room, this superstructure contains a cargo control room outfitted with instrumentation and controls to enable remote and automatic monitoring of the cargo tanks 2, barrier spaces 21, void spaces 14, and all cargo service systems operation. In addition to the monitoring equipment contained in the cargo control room, a repeat monitor is provided on the bridge and in the engineers' stateroom to sound an alarm in the event a malfunction or off-design limit occurs at any monitoring point.

A plurality of pipes (not shown) required for servicing each of the tanks 2 will enter only through the top of tank truck 65. Conventional arrangements are provided for flexibly sealing and insulating tank truck 65 as generally indicated by 4.

Also, each tank 2 can be subdivided by longitudinal and/or transverse bulkheads (not shown) to minimize the amount of chlorine released in the event of tank failure.

Various modifications and changes will occur to those skilled in this art from a knowledge of the foregoing disclosure. Such obvious changes and modifications are deemed to come within the purview of the invention.

What is claimed is:

1. A ship and tank system for transporting chlorine cargo, the system comprising a ship shell, a plurality of closed cargo tanks constituting primary barriers located within the ship shell along its centerline and extending a substantial distance along the beam of the ship, a body of chlorine substantially filling said closed cargo tanks, a secondary barrier structure spaced from said ship shell by at least 15% of the beam of the ship established at the maximum ship's beam and from and surrounding each said primary barrier with a barrier space defined between the primary and secondary barriers, at least the portion of the space defined between the secondary barrier and the ship shell surrounding said secondary barrier constituting void space, means mounted in other portions of the space defined between the secondary barrier and the ship hull defining ballast spaces, collision protection means mounted in the space defined between the secondary barrier and the ship shell, the forward part of the ship system being defined by a deep bow section, a closed air circuit including said barrier space, and means for refrigerating air in the air circuit to a temperature less than the saturation temperature of the cargo at ambient pressure.

2. The ship system of claim 1 wherein a cofferdam is located forward of the forwardmost cargo tank segregating the cargo section from the bow section of the ship system.

3. The ship system of claim 1 wherein a cofferdam is located aft of the aftmost cargo tank segregating the cargo section from the stern section of the ship system.

4. The ship system of claim 1 wherein a first cofferdam is located forward of the forwardmost cargo tank segregating the cargo section from the bow section of the ship system and a second cofferdam is located aft of the aftmost cargo tank segregating the cargo section from the stern section of the ship system.

5. The ship system of claim 1 further including a tank stabilization system.

6. The ship system of claim 4 further including a passive tank stabilization system located aft of the second cofferdam.

7. The ship system of claim 1 wherein said collision protection means includes collision decks and web frames located in the space between the ship shell and the secondary barrier.

8. The ship system of claim 1 wherein the inner surface of the secondary barrier is insulated.

9. The ship system of claim 8 wherein the insulation is effected by means of foam plastic.

10. The ship system of claim 9 wherein an impervious liner covers said foam palstic.

11. The ship system of claim 1 wherein bulkheads subdivide each cargo tank.

12. The ship system of claim 11 wherein said bulkheads extend transversely and longitudinally.

13. The ship system of claim 1 wherein collection means are provided to collect condensed cargo in said air circuit and return same to said cargo tanks.

14. The ship system of claim 1 wherein said ballast spaces are defined by inclined bulkheads.

15. The ship system of claim 14 wherein said inclined bulkheads contact the secondary barrier along one line only.

16. The ship system as defined in claim 14 wherein the inclined bulkheads are spaced from the secondary barrier.

17. The ship system as defined in claim 1 wherein said ballast spaces are defined by vertical bulkheads spaced from the secondary barrier.

18. The ship system of claim 1 wherein the secondary barrier includes a pair of longitudinal bulkheads and an inner bottom.

19. The ship system of claim 18 wherein the longitudinal bulkheads of the secondary barrier are shaped to maintain the space between the longitudinal bulkheads and the ship's shell uniform throughout the cargo section of the ship system.

References Cited

UNITED STATES PATENTS

| | | | |
|---|---|---|---|
| 2,933,902 | 4/1960 | Howard | 114—74X |
| 3,011,321 | 12/1961 | Clauson | 62—45 |
| 3,031,856 | 5/1962 | Wiedemann et al. | 114—74X |
| 3,110,156 | 12/1963 | Niemann | 62—45 |
| 3,213,632 | 10/1965 | Valk et al. | 114—74X |
| 3,229,473 | 1/1966 | Schumacher et al. | 62—45 |
| 3,280,779 | 10/1966 | Breit, Jr. | 114—74 |
| 3,313,116 | 4/1967 | Nonnecke et al. | 62—55 |
| 3,368,509 | 2/1968 | Knight, Jr. et al. | 114—125X |
| 3,386,257 | 6/1968 | Beazer | 62—55X |
| 3,453,836 | 7/1969 | Kerr | 62—55X |

FOREIGN PATENTS

| | | | |
|---|---|---|---|
| 921,696 | 3/1963 | Great Britain | 114—74 |
| 1,225,002 | 2/1960 | France | 114—74 |

OTHER REFERENCES

Motor Ship, The Methane Tanker, Jules Verne, October 1964, pp. 276 to 279.

ALBERT W. DAVIS, JR., Primary Examiner

U.S. Cl. X.R.

62—55; 114—74A; 220—9LG